US012592914B2

(12) United States Patent   (10) Patent No.: US 12,592,914 B2
Rosomakho   (45) Date of Patent: Mar. 31, 2026

(54) SYSTEMS AND METHODS FOR INLINE HYPERTEXT TRANSFER PROTOCOL (HTTP) COOKIE ENCRYPTION

(71) Applicant: Zscaler, Inc., San Jose, CA (US)

(72) Inventor: Yaroslav Rosomakho, Thatcham (GB)

(73) Assignee: Zscaler, Inc., San Jose, CA (US)

( * ) Notice: Subject to any disclaimer, the term of this patent is extended or adjusted under 35 U.S.C. 154(b) by 127 days.

(21) Appl. No.: 18/437,480

(22) Filed: Feb. 9, 2024

(65) Prior Publication Data

US 2025/0260674 A1     Aug. 14, 2025

(51) Int. Cl.
*H04L 9/40*          (2022.01)
(52) U.S. Cl.
CPC ................................ *H04L 63/0428* (2013.01)
(58) Field of Classification Search
CPC ..... H04L 63/0428; H04L 63/14; H04L 67/10; H04L 9/32; H04L 63/428; H04L 63/10; G06F 21/62; G06F 21/55; H04W 12/06; H04W 8/18; H04W 4/80; H04W 16/14; H04W 36/00; H04W 40/00; H04W 24/02; H04W 76/00
USPC ......................................................... 713/168
See application file for complete search history.

(56) References Cited

U.S. PATENT DOCUMENTS 7,043,455 B1 * 5/2006 Cuomo ............. G06Q 20/3674
                                                          705/64
8,219,687 B2 * 7/2012 Huang .................... G06F 21/34
                                                          709/227

| | | | | |
|---|---|---|---|---|
| 8,281,021 B1 * | 10/2012 | Smith | ................. | H04W 12/033 |
| | | | | 709/228 |
| 8,448,233 B2 * | 5/2013 | Shulman | ............. | H04L 63/1425 |
| | | | | 713/176 |
| 9,286,471 B2 * | 3/2016 | Qureshi | .................... | G06F 8/53 |
| 9,602,537 B2 * | 3/2017 | Petty | .................. | H04L 63/0823 |
| 10,897,458 B1 * | 1/2021 | Coral | .................. | H04L 63/0245 |
| 12,132,708 B2 * | 10/2024 | Nilekar | ............... | H04L 63/0263 |
| 12,132,788 B2 * | 10/2024 | Kauffman | ............... | H04L 67/02 |
| 2007/0245137 A1 * | 10/2007 | Bhagat | .................. | H04L 67/146 |
| | | | | 713/153 |
| 2015/0012751 A1 * | 1/2015 | Forster | .................. | H04L 63/029 |
| | | | | 713/171 |
| 2015/0113604 A1 * | 4/2015 | Oyman | ............... | H04L 65/1059 |
| | | | | 726/4 |
| 2016/0112375 A1 * | 4/2016 | Cohen | ..................... | H04L 67/34 |
| | | | | 726/23 |
| 2022/0158831 A1 * | 5/2022 | Wing | .................. | H04L 63/1466 |
| 2024/0089250 A1 * | 3/2024 | Conway | ............... | H04L 63/083 |
| 2025/0039173 A1 * | 1/2025 | Azrielant | ............ | H04L 63/0236 |

* cited by examiner

*Primary Examiner* — Sargon N Nano
(74) *Attorney, Agent, or Firm* — Baratta Law PLLC; Lawrence A. Baratta, Jr.; Ryan Odessa

(57) ABSTRACT

Systems and methods for inline HTTP cookie encryption include responsive to a user authenticating to a web service, intercepting a response form the web service; encrypting an HTTP cookie in the response; and forwarding the response to the user, the response comprising the encrypted HTTP cookie. Responsive to intercepting a subsequent request from the user to the web service, wherein the subsequent request includes the encrypted HTTP cookie; decrypting the encrypted HTTP cookie; and forwarding the subsequent request to the web service with the decrypted HTTP cookie.

18 Claims, 8 Drawing Sheets

700

RESPONSIVE TO A USER AUTHENTICATING TO A WEB SERVICE, INTERCEPTING A RESPONSE FORM THE WEB SERVICE

ENCRYPTING A HYPERTEXT TRANSFER PROTOCOL (HTTP) COOKIE IN THE RESPONSE

FORWARDING THE RESPONSE TO THE USER, THE RESPONSE COMPRISING THE ENCRYPTED HTTP COOKIE

SYSTEMS AND METHODS FOR INLINE HYPERTEXT TRANSFER PROTOCOL (HTTP) COOKIE ENCRYPTION

FIELD OF THE DISCLOSURE

The present disclosure relates generally to networking and computing. More particularly, the present disclosure relates to systems and methods for inline Hypertext Transfer Protocol (HTTP) cookie encryption.

BACKGROUND OF THE DISCLOSURE

When users are authenticated to access a web application, the web application typically issues a Hypertext Transfer Protocol (HTTP) cookie. This HTTP cookie is used by the web application and accompanying systems to maintain the authentication of the user and maintain an application state without requiring the user to re-authenticate for each request. Many web security solutions provide access control during the authentication and authorization process, although, once authentication and authorization is completed, and an HTTP cookie is issued, a user can bypass the security enforcement provided by these solutions. These security products and systems can be bypassed due to stolen or exported cookies, deactivation of security products, and mobility of users. By utilizing the present inline HTTP encryption systems and methods, these issues can be avoided and eliminated by encrypting the issued HTTP cookie inline, thereby stopping the user from having access or knowledge of the originally issued HTTP cookie.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include responsive to a user authenticating to a web service, intercepting a response form the web service; encrypting a Hypertext Transfer Protocol (HTTP) cookie in the response; and forwarding the response to the user, the response comprising the encrypted HTTP cookie.

The steps can further include performing inline monitoring via a cloud-based system of traffic between (i) a user device associated with the user, and (ii) the web service. The intercepting can be via a node of the cloud-based system, wherein the node is adapted to enforce one or more web security solutions. The steps can further include intercepting a subsequent request from the user to the web service, wherein the subsequent request includes the encrypted HTTP cookie; decrypting the encrypted HTTP cookie; and forwarding the subsequent request to the web service with the decrypted HTTP cookie. The steps can further include enforcing one or more web security solutions on the subsequent request; and forwarding the subsequent request and the decrypted HTTP cookie to the web service based thereon. Prior to the encrypting, the steps can further include enabling HTTP encryption via a Graphical User Interface (GUI). The web service can be any of a Software-as-a-Service (SaaS) application, an enterprise file share, a web application, and a private application. The user does not receive and does not have access to the HTTP cookie in the response because the encrypted HTTP session cookie has an HTTPOnly flag set, thus, the end user application treats it as an opaque token and does not inspect it or provide contents to the user. The web service does not receive and does not have access to the encrypted HTTP cookie. That is, the web service receives only the decrypted HTTP cookie and does not have access or knowledge about the inline encryption process. The steps can further include authenticating the user for the web service, wherein the authenticating includes determining if the user belongs to one or more user groups; and performing the encrypting based on the user belonging to one or more user groups.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
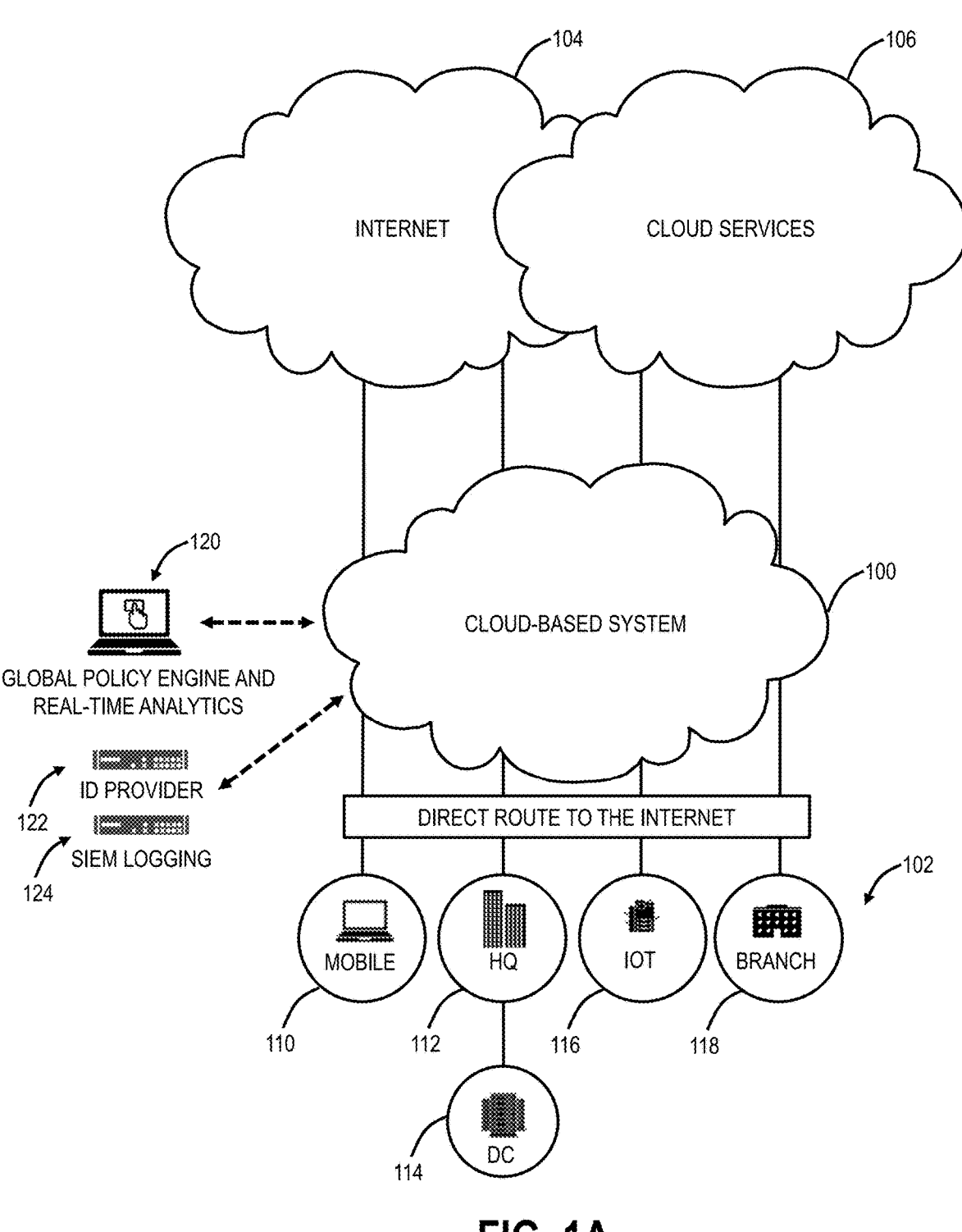
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL), Transport Layer Security (TLS) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or TLS-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
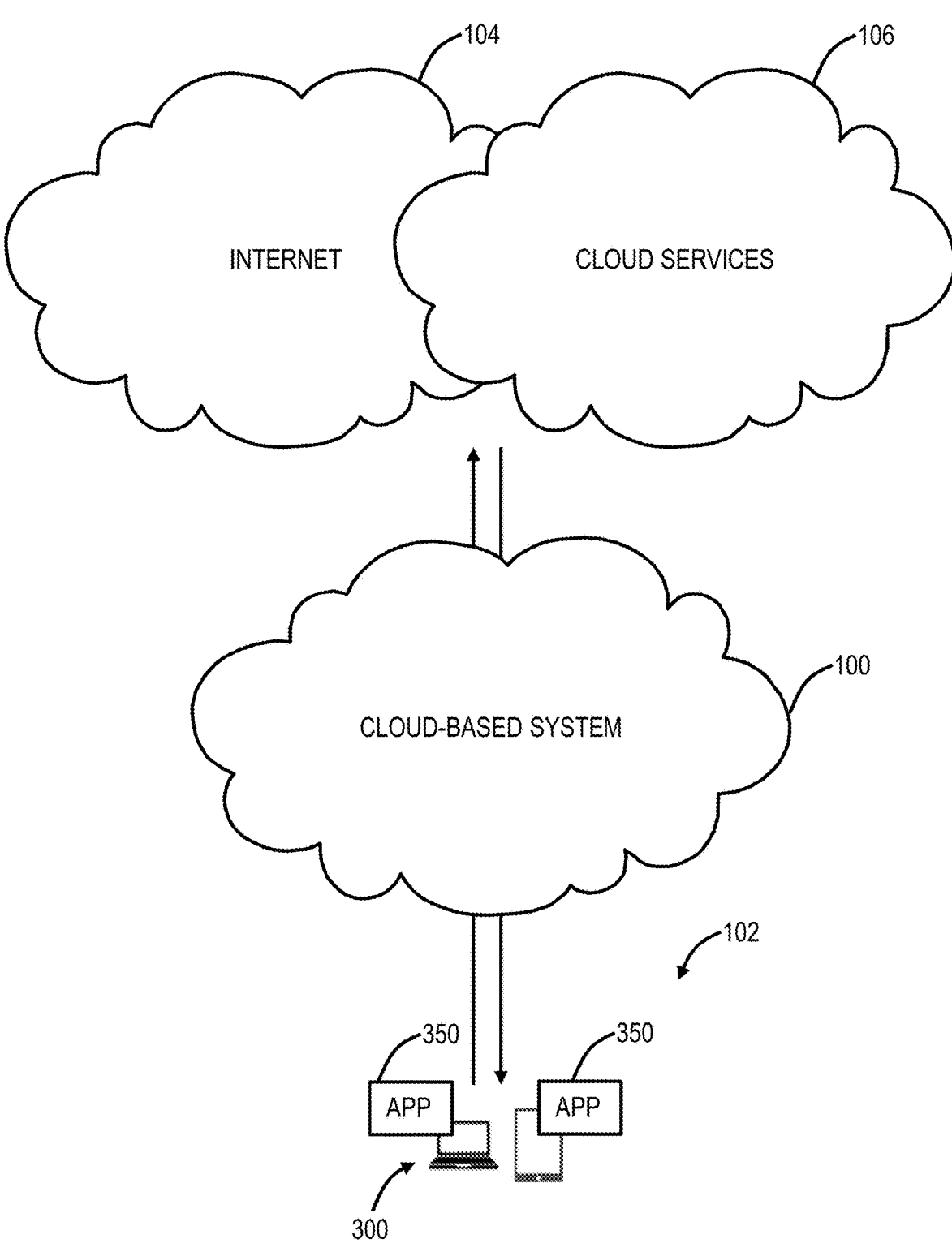
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
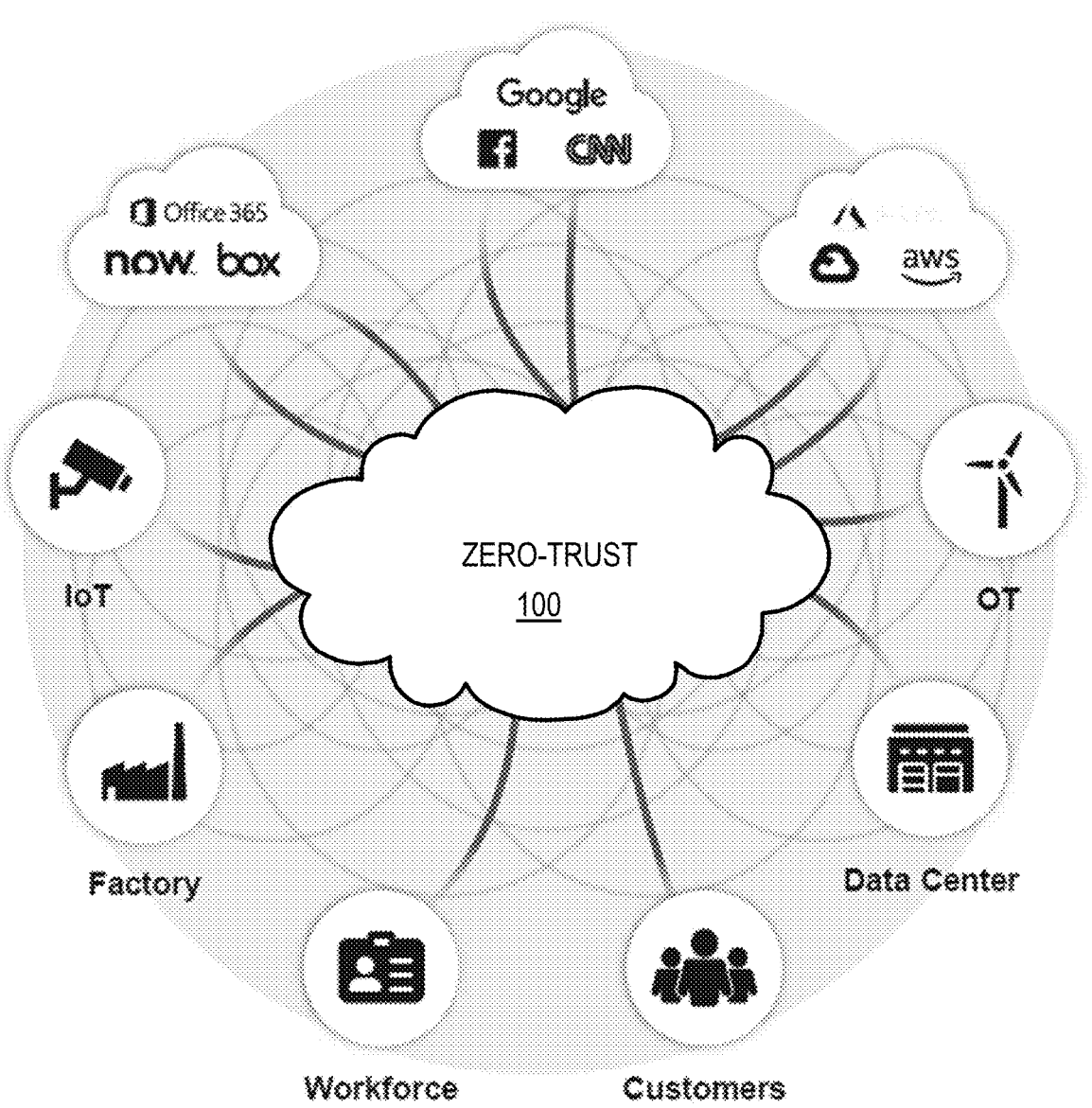
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
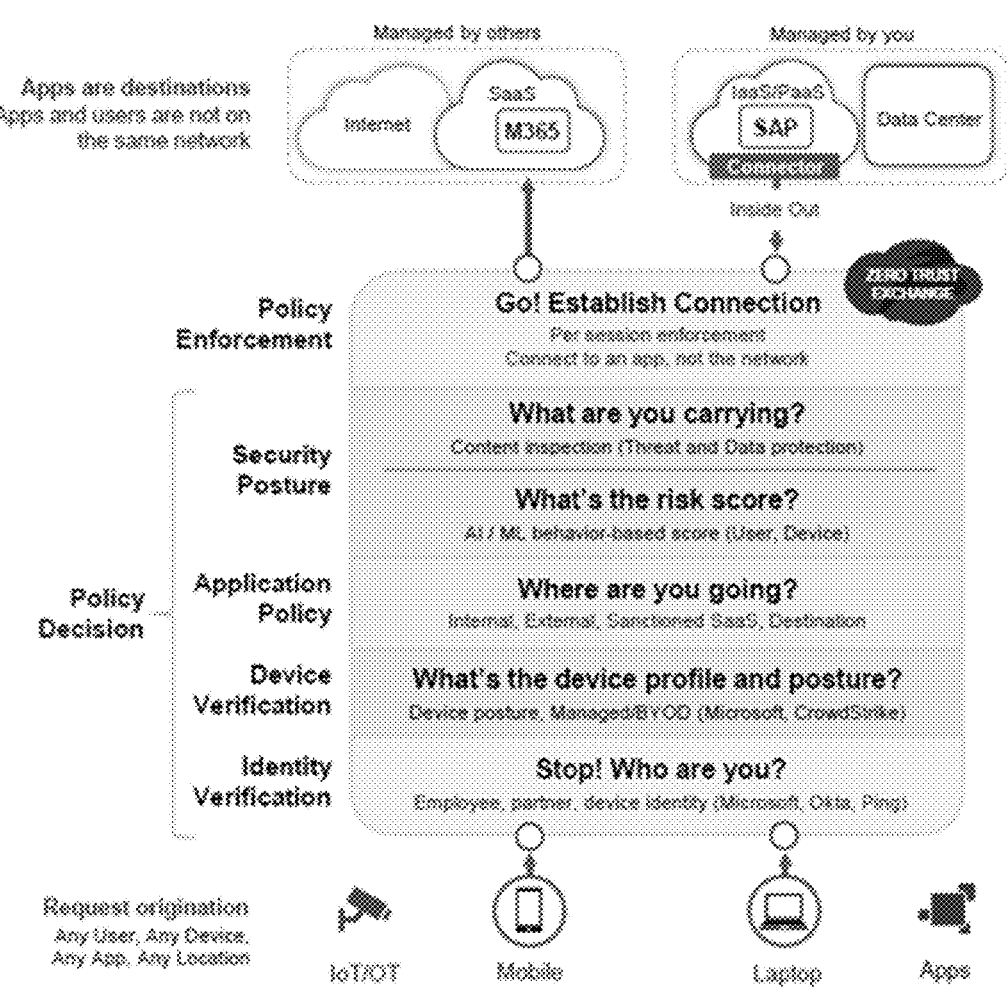
FIG. 1C is a logical diagram illustrating zero trust policies with the cloud-based system and a comparison with the conventional firewall-based approach.
Figure 1C:

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
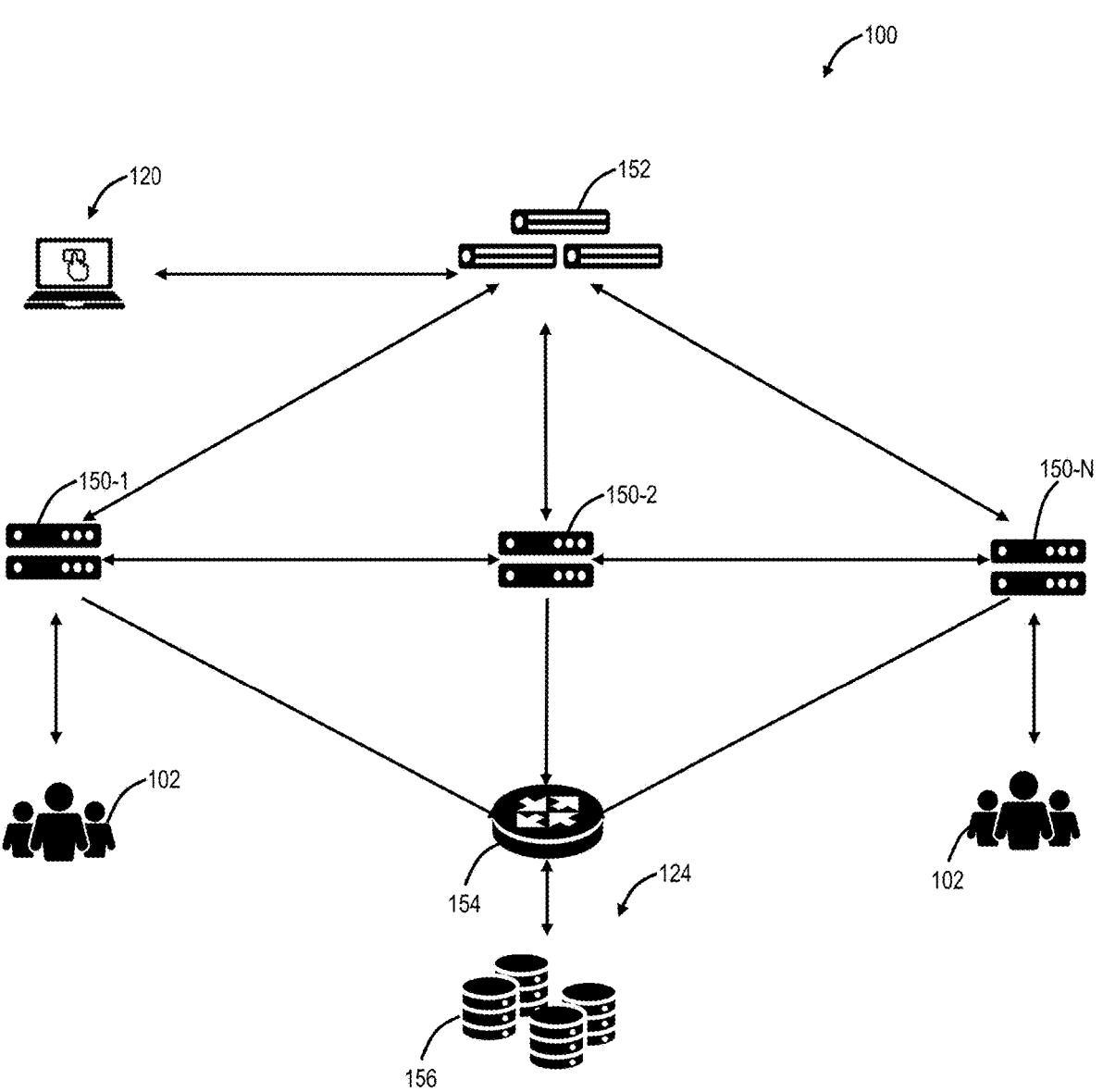
FIG. 2 is a network diagram of an example implementation of the cloud-based system.
Figure 4:
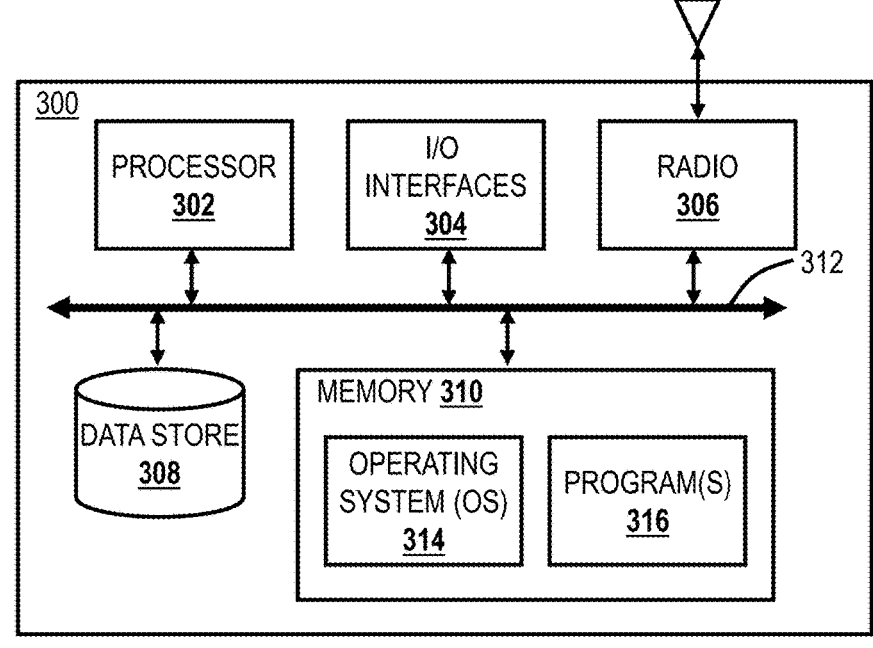

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
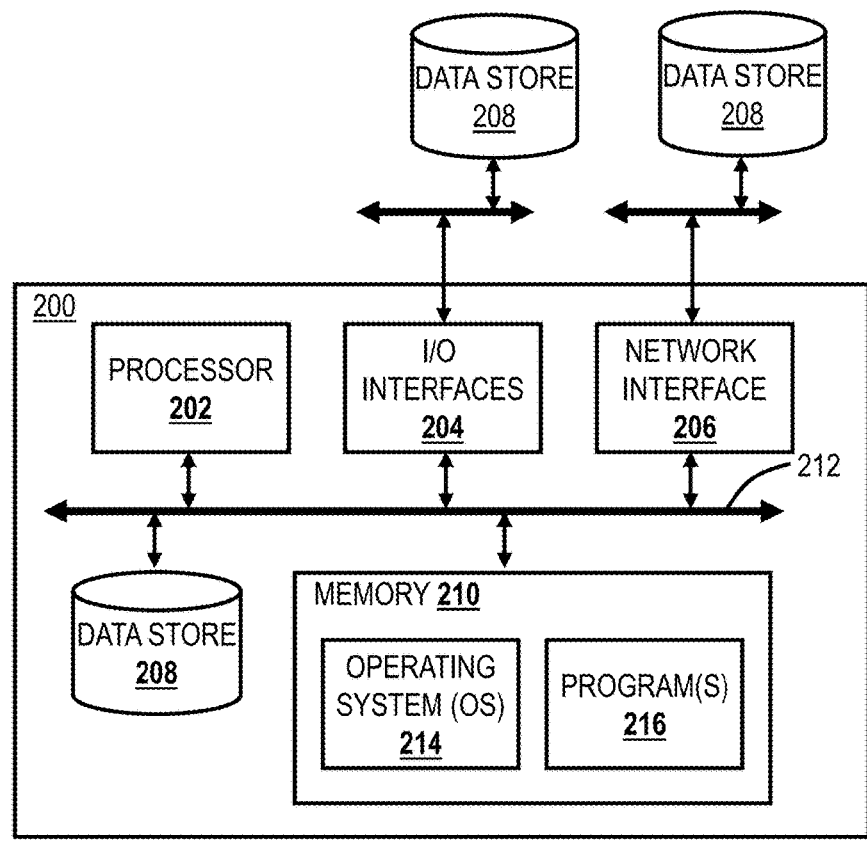
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like.

System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

Inline Hypertext Transfer Protocol (HTTP) Cookie Encryption

Many web applications, responsive to authentication, issue Hypertext Transfer Protocol (HTTP) session cookies with HTTPOnly flags (HTTP-only cookies) to web browsers or endpoint software used by the authenticated user 102 and device 300. These cookies are used to maintain user sessions, retain application-specific states, and are applied to all versions of HTTP. Inline web security products and services, such as those described herein, provide restrictions and enforcement to the user authentication, authorization processes, and inline traffic. Although, once an HTTP cookie is issued, the user could move away from inline security without breaking the established session with the web application. Further, HTTP cookies can be stolen or exported from authorized endpoints or software to compromise access to the web application for which it was issued.

HTTP session management can be challenging as a vast majority of services rely on HTTP cookies to maintain user states. These cookies are issued by servers associated with and retained by browsers or web-driven applications. Various issues associated with such issuance of HTTP cookies include stolen cookies, and the enforcement of session restrictions. That is, cookies can be stolen at the application level, and session enforcement restriction typically happens only during authentication. Once a user is issued a session cookie, restrictions usually no longer apply.

These issues are troublesome for Cloud Access Security Brokers (CASB), Next-Generation Firewalls (NGFW), and Secure Web Gateways (SWG) that are adapted to enforce various restrictions and access controls on authentication only. Once a user is in, if CASB/SWG is disabled or bypassed, access to the cloud application remains. For instance, the cloud-based system 100 enforces steering services to access corporate application instances. Although, after authentication, these services can be disabled by the user while access remains.

For example, the various security solutions enforced by the cloud-based system 100, such as the access control described herein via SWG, can enforce access restrictions such as only allowing access to specific applications if the user is in an enterprise location, i.e., an office, or using an enterprise issued device. As described, these restrictions may only be enforced during authentication of the user during initial access of the application. The problems arise when, once the user is authenticated/granted access to an application and issued an HTTP cookie, the user can move away from an enterprise location and access the application outside of the controls of the various security solutions/ products, and/or disable the various security solutions/products. Similarly, a user can potentially copy the access token (contents of the HTTP cookie) to a different device, and continue accessing the application via a new unprotected device within the same session.

In order to protect such user sessions and ensure that users do not move outside of the provided security coverage, the present disclosure provides systems and methods for inline HTTP cookie encryption. By utilizing the present systems and methods, HTTP cookies can be transparently encrypted by the cloud-based system 100 via the various security products and services provided therein. In various embodiments, the encryption is applied during the processing of an HTTP response with the corresponding Set-Cookie HTTP header. Similarly, the decryption can be applied when processing an HTTP Cookie header in a subsequent response from the client.

The encryption approaches described herein do not affect operation of the web application or endpoint software because the HTTP session cookie designated by the HTTPOnly flag is transient for the endpoint software and not accessible or mutable by endpoint application logic. Further, the user 102, the user device 300, and the web service are not aware of the encryption/decryption because it is performed inline between the components. In various embodiments, based on specific security requirements by the customers of the cloud-based system 100, various encryption and/or obfuscation algorithms can be used with either common, organization-specific, department-specific, or user-specific encryption keys. Further, the cookie name may be modified in order to eliminate potential impact on application operation when users are not covered by inline security controls and cookie decryption is not applied.

The HTTP session cookie encryption services described herein can be enabled via administrative Graphical User Interfaces (GUIs), APIs, etc. (interfaces) associated with customers of the cloud-based system 100. That is, the inline encryption of HTTP session cookies can be enabled for specific individual clients, users, user groups, customers, applications, etc. of the cloud-based system 100 by enabling an HTTP cookie flag through GUIs associated with security controls. For example, as part of the present systems and methods, the systems can be adapted to, during authentication, determine if the user belongs to one or more user groups. Based thereon, the systems can enforce the present inline HTTP encryption. The user groups can be preconfigured for customers of the cloud-based system, for example, based on high risk users, departments, etc.

Figure 6:
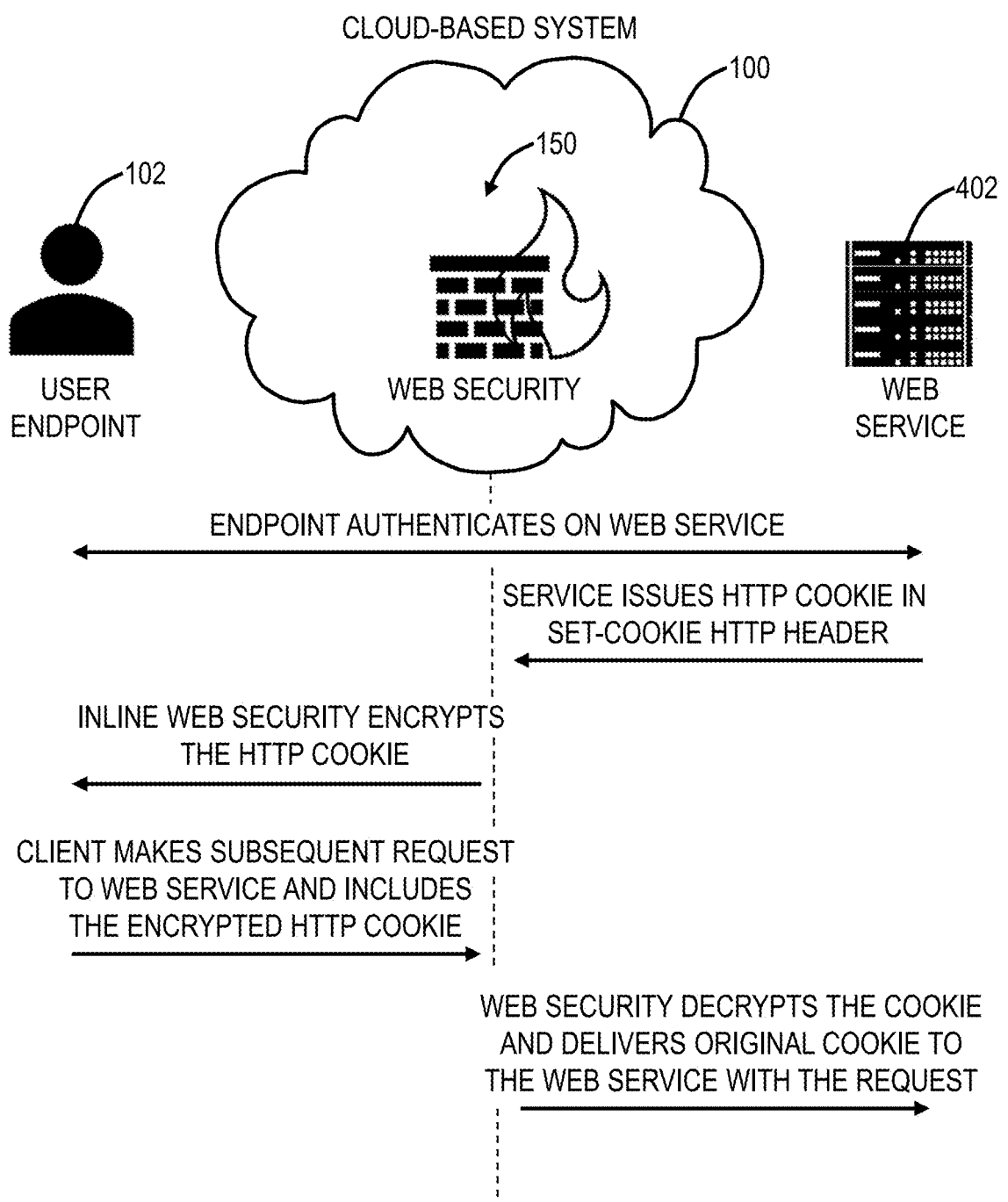
FIG. 6 is a flow diagram of an embodiment for inline encryption of HTTP session cookies.

FIG. 6 is a flow diagram of an embodiment for inline encryption of HTTP session cookies. Again, the cloud-based system 100 via one or more nodes 150 is adapted to enforce the various web security services and products described herein. A user 102, via a user device 300, can authenticate to a web service 402, i.e., a Software-as-a-Service (SaaS) application, enterprise file share, web application, private application, or the like. Responsive to the web service 402 issuing an HTTP cookie, the cloud-based system 100, via one or more nodes 150, can intercept this response and encrypt the issued HTTP cookie. The encrypted HTTP cookie is then passed to the user 102. In any subsequent requests from the user 102 to the web service 402 which includes the encrypted HTTP cookie, the cloud-based system 100 is adapted to intercept the request and decrypt the HTTP cookie before passing the request to the web service 402. In various embodiments, the intercepting, encrypting, and decrypting can be performed by the application 350 in coordination with the cloud-based system 100. That is, the application 350 can be adapted to ingest live traffic and perform the encrypting and decrypting based thereon.

Therefore, the user 102 does not receive the actual issued HTTP cookie, but instead receives an encrypted version. Similarly, the web service does not receive the encrypted HTTP cookie but receives the decrypted HTTP cookie from the cloud-based system with the response. That is, if the user bypasses the web security services in subsequent requests, the web service would not be able to identify the cookie, and the session would not continue without reauthentication through the cloud-based system 100.

Utilization of the present systems and methods ensures that issued HTTP cookies are encrypted by the cloud-based system 100 before they reach a user, service, client, endpoint, etc. by doing so, the issued cookie is protected and thereby eliminated that risk of user sessions being hijacked. By utilizing the present systems and methods for inline HTTP cookie encryption, it can be ensured that web application sessions are only valid as long as traffic is passed through the various web security products and services of the cloud-based system 100. Further, stolen or exported cookies become invalid and do not grant access to web applications due to the clients not having access or knowing the original HTTP cookie.

Process for Inline HTTP Cookie Encryption

Figure 7:
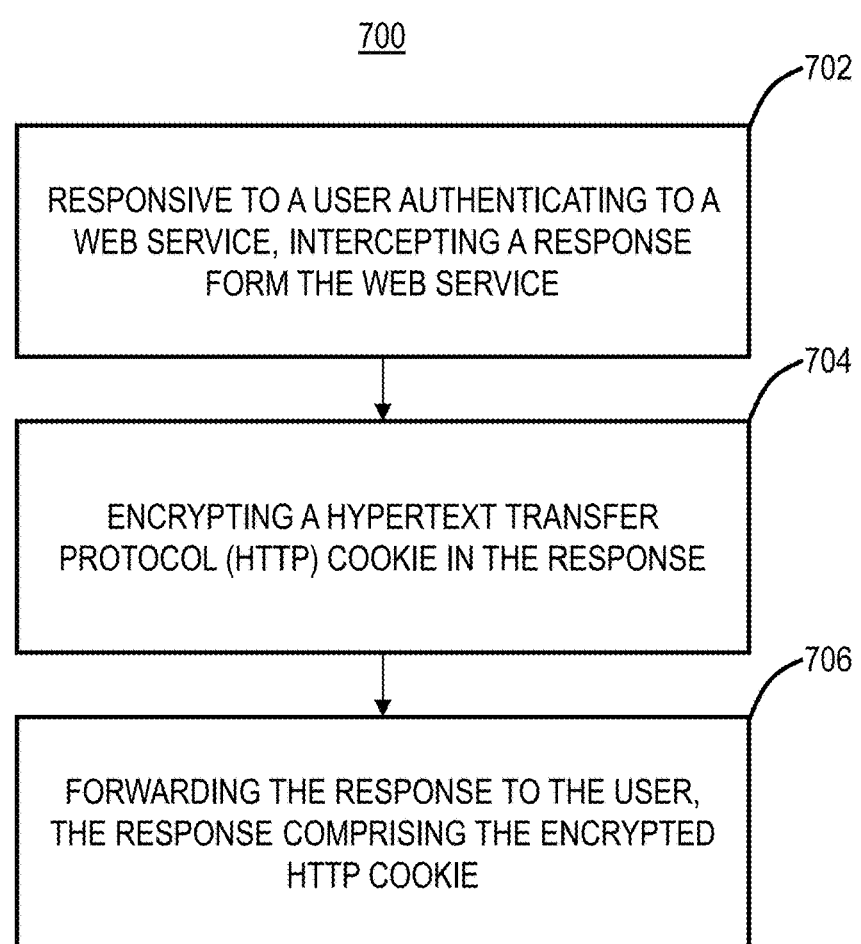
FIG. 7 is a flow chart of a process for inline Hypertext Transfer Protocol (HTTP) cookie encryption.

FIG. 7 is a flow chart of a process 700 for inline HTTP cookie encryption. The process 700 includes responsive to a user authenticating to a web service, intercepting a response form the web service (step 702); encrypting a Hypertext Transfer Protocol (HTTP) cookie in the response (step 704); and forwarding the response to the user, the response comprising the encrypted HTTP cookie (step 706).

The process 700 can further include performing inline monitoring via a cloud-based system of traffic between (i) a user device associated with the user, and (ii) the web service. The intercepting can be via a node of the cloud-based system, wherein the node is adapted to enforce one or more web security solutions. The steps can further include intercepting a subsequent request from the user to the web service, wherein the subsequent request includes the encrypted HTTP cookie; decrypting the encrypted HTTP cookie; and forwarding the subsequent request to the web service with the decrypted HTTP cookie. The steps can further include enforcing one or more web security solutions on the subsequent request; and forwarding the subsequent request and the decrypted HTTP cookie to the web service based thereon. Prior to the encrypting, the steps can further include enabling HTTP session cookie encryption via an interface. The web service can be any of a Software-as-a-Service (SaaS) application, an enterprise file share, a web application, and a private application. The user does not receive and does not have access to the HTTP cookie in the response. The web service does not receive and does not have access to the encrypted HTTP cookie. The steps can further include authenticating the user for the web service, wherein the authenticating includes determining if the user belongs to one or more user groups; and performing the encrypting based on the user belonging to one or more user groups.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   responsive to a user authenticating to a web service, at a cloud-based security node having one or more processors, intercepting a response form the web service;
   encrypting, via an inline encryption engine of the cloud-based security node, a Hypertext Transfer Protocol (HTTP) cookie contained in the response, the encrypting rendering the HTTP session cookie opaque to an endpoint device of the user by applying an HTTPOnly flag and storing the original cookie in secure memory inaccessible to the endpoint device;
   forwarding the response to the user, the response comprising the encrypted HTTP cookie; and
   enforcing zero trust access policies during subsequent requests from the endpoint device by intercepting the subsequent requests at the cloud-based security node, decrypting the encrypted HTTP session cookie using a tenant-specific key, and conditionally forwarding the decrypted HTTP session cookie to the web service only when the zero trust access policies, wherein the user does not receive, and does not have access to the HTTP cookie in the response, the response comprising an encrypted cookie with an HTTPOnly flag such that no application programming interface of the endpoint device can access the cookie.

2. The method of claim 1, wherein the steps comprise:
   performing inline monitoring via the cloud-based security node in a cloud-based system of traffic between (i) a user device associated with the user, and (ii) the web service.

3. The method of claim 1, wherein the intercepting is via the cloud-based security node configured to terminate every connection for inspection, including encrypted traffic, and wherein the cloud-based security node is adapted to enforce one or more web security solutions.

4. The method of claim 1, wherein the steps further comprise:
   intercepting a subsequent request from the user to the web service, wherein the subsequent request includes the encrypted HTTP cookie;
   decrypting the encrypted HTTP cookie; and
   forwarding the subsequent request to the web service with the decrypted HTTP cookie.

5. The method of claim 4, wherein the steps further comprise:
   enforcing one or more web security solutions on the subsequent request; and
   forwarding the subsequent request and the decrypted HTTP cookie to the web service based thereon.

6. The method of claim 1, wherein prior to the encrypting, the steps comprise:
   enabling HTTP session cookie encryption via an interface.

7. The method of claim 1, wherein the web service is any of a Software-as-a-Service (SaaS) application, an enterprise file share, a web application, and a private application.

8. The method of claim 1, wherein the web service does not receive, and does not have access to contents of the encrypted HTTP cookie, the web service receiving only a decrypted cookie from the cloud-based security node and lacking access to the original issued cookie.

9. The method of claim 1, wherein the steps comprise:
   authenticating the user for the web service, wherein the authenticating includes determining if the user belongs to one or more user groups; and
   performing the encrypting based on the user belonging to one or more user groups.

10. A non-transitory computer-readable medium comprising instructions that, when executed by one or more processors of a cloud-based security node, cause the one or more processors to perform steps of:
   responsive to a user authenticating to a web service, intercepting a response form the web service;
   encrypting, via an inline encryption engine of the cloud-based security node, a Hypertext Transfer Protocol (HTTP) cookie contained in the response, including applying an HTTPOnly flag to ensure that the encrypted cookie is opaque to endpoint applications and inaccessible to the user;

forwarding the response to the user, the response comprising the encrypted HTTP cookie; and intercepting subsequent requests from the user, decrypting the encrypted HTTP session cookie using a key stored in secure memory of the cloud-based security node, enforcing one or more zero trust access policies based on user group membership or device context, and forwarding the decrypted cookie with the request to the web service only if the zero trust access policies are satisfied, wherein the user does not receive, and does not have access to the HTTP cookie in the response, the response comprising an encrypted cookie with an HTTPOnly flag such that no application programming interface of the endpoint device can access the cookie.

11. The non-transitory computer-readable medium of claim 10, wherein the steps comprise:

performing inline monitoring via the cloud-based security node in a cloud-based system of traffic between (i) a user device associated with the user, and (ii) the web service.

12. The non-transitory computer-readable medium of claim 10, wherein the intercepting is via the cloud-based security node configured to terminate every connection for inspection, including encrypted traffic, and wherein the cloud-based security node is adapted to enforce one or more web security solutions.

13. The non-transitory computer-readable medium of claim 10, wherein the steps further comprise:

intercepting a subsequent request from the user to the web service, wherein the subsequent request includes the encrypted HTTP cookie;

decrypting the encrypted HTTP cookie; and forwarding the subsequent request to the web service with the decrypted HTTP cookie.

14. The non-transitory computer-readable medium of claim 13, wherein the steps further comprise:

enforcing one or more web security solutions on the subsequent request; and forwarding the subsequent request and the decrypted HTTP cookie to the web service based thereon.

15. The non-transitory computer-readable medium of claim 10, wherein prior to the encrypting, the steps comprise:

enabling HTTP session cookie encryption via an interface.

16. The non-transitory computer-readable medium of claim 10, wherein the web service is any of a Software-as-a-Service (SaaS) application, an enterprise file share, a web application, and a private application.

17. The non-transitory computer-readable medium of claim 10, wherein the web service does not receive, and does not have access to the encrypted HTTP cookie, the web service receiving only a decrypted cookie from the cloud-based security node and lacking access to the original issued cookie.

18. The non-transitory computer-readable medium of claim 10, wherein the steps comprise:

authenticating the user for the web service, wherein the authenticating includes determining if the user belongs to one or more user groups; and performing the encrypting based on the user belonging to one or more user groups.

* * * * *